(12) United States Patent
Yoon

(10) Patent No.: US 7,620,519 B2
(45) Date of Patent: Nov. 17, 2009

(54) BURN-IN PROCESS OF PRODUCING DATA CORRELATING ELEVATION OF DISK DRIVE HEAD TO TEMPERATURE AND METHOD OF CONTROLLING THE ELEVATION OF THE DISK DRIVE HEAD USING THE DATA

(75) Inventor: Jung-min Yoon, Gunpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 47 days.

(21) Appl. No.: 11/946,957

(22) Filed: Nov. 29, 2007

(65) Prior Publication Data

US 2008/0204923 A1    Aug. 28, 2008

(30) Foreign Application Priority Data

Feb. 23, 2007    (KR) .................. 10-2007-0018519

(51) Int. Cl.
*G01B 21/18* (2006.01)
(52) U.S. Cl. ................. 702/166; 702/35; 702/81; 702/99; 360/31; 360/59; 360/86; 324/73.1; 324/158.1; 324/760
(58) Field of Classification Search .......... 702/35, 702/81, 94, 99, 166; 360/31, 59, 75, 86, 360/97.02; 324/760, 158.1, 73.1
See application file for complete search history.

(56) References Cited

U.S. PATENT DOCUMENTS 6,169,413 B1 *   1/2001   Paek et al. ............. 324/760
6,930,844 B2 *   8/2005   Yeh et al. ............... 360/31
7,180,692 B1 *   2/2007   Che et al. ............... 360/31
2006/0066978 A1   3/2006   Takagi et al.
2006/0119974 A1   6/2006   Yamazaki et al.

FOREIGN PATENT DOCUMENTS

JP    2004079126    3/2004

OTHER PUBLICATIONS

Goh et al., 'An Expert System for Failure Analysis and Disposition of Hard Disk Drives', Sep. 1990, IEEE Publication, pp. 741-745.*

* cited by examiner

*Primary Examiner*—Edward Raymond
*Assistant Examiner*—Elias Desta
(74) *Attorney, Agent, or Firm*—Volentine & Whitt, PLLC

(57) ABSTRACT

Data characterizing a read/write head of a hard disk drive is produced in a burn-in process. The method includes measuring the flying height of the head at a first temperature in a burn-in chamber, measuring the flying height of the head at a second temperature in the burn-in chamber, postulating a linear relationship between the flying height and the temperature of ambient air using values of the flying height measured at the first and second temperatures, and estimating the flying height of the head at a third temperature using the linear relationship. The elevation of the read/write head is then controlled based on data representing the values of the flying height as measured at the first and second temperatures and as estimated for the temperature. In particular, the amount of electric power supplied to an FOD heater of the head is controlled based on the data generated during the burn-in process.

21 Claims, 9 Drawing Sheets

BURN-IN PROCESS OF PRODUCING DATA CORRELATING ELEVATION OF DISK DRIVE HEAD TO TEMPERATURE AND METHOD OF CONTROLLING THE ELEVATION OF THE DISK DRIVE HEAD USING THE DATA

BACKGROUND OF THE INVENTION

1. Field of the Invention

The present invention relates to a hard disk drive. More particularly, the present invention relates to a method of determining operating characteristics of a read/write head of the disk drive, and to a method of controlling the elevation of the head using the characteristics.

2. Description of the Related Art

A hard disk drive is a data storage device in which data is read from and recorded onto a disk using a magnetic read/write head. More specifically, bits of the data are recorded onto and read from respective tracks on a magnetic recoding surface of the disk. To this end, the magnetic head is positioned over and in alignment with a desired track of the disk during a read/write operation in which the disk is rotated. Today, there is an ongoing demand for hard disk drives that are lighter and yet have higher and higher data storage capacities. Thus, the capacity of the magnetic disk of a hard disk drive, namely the number of bits per inch (BPI) and tracks per inch (TPI), is being increased to meet such a demand. Accordingly, developments in hard disk drives are also aimed at reducing the height at which the magnetic head is floated above the recording surface of the disk during a read/write operation, and increasing the frequency at which the bits of data can be read and recorded.

FIG. 1 shows a conventional hard disk drive 100. The conventional hard disk drive 100 includes at least one disk 112, a spindle motor 114 for rotating the disk, and a magnetic read/write head 120 for recording data onto and reading data from the disk 112. In particular, the head 120 reads or records information from or onto the disk 112 by detecting a magnetic field produced by the recording surface of the disk 112 or by magnetizing the surface of the disk 112. And, although FIG. 1 shows the read/write head 120 of the hard disk drive 100 as a single component, the read/write head usually includes a recording element for magnetizing the disk 112 and a separate reading element for detecting the magnetic field of the disk 112.

In any case, the hard disk drive 100 is designed such that the read/write head 120 and the disk 112 act as an air bearing. In this respect, the head 120 is coupled to a suspension 122 and is supported by the suspension such that the head 120 can move vertically relative the disk 112. Also, the head 120 has an air bearing surface that faces the disk 11. The suspension 122, in turn, is attached to an actuator 124 having a voice coil 126. The actuator 124 is mounted to a pivot bearing 132 so as to be rotatable about a central axis of the pivot bearing 132.

The voice coil 126 is disposed adjacent a magnetic assembly 130. Together, the voice coil 126 and the magnetic assembly 130 make up a voice coil motor for rotating the actuator 124 about the axis of the pivot bearing 132. More specifically, current supplied to the voice coil 126, within the magnetic field generated by the magnetic assembly 130, produces torque that rotates the actuator 124 about the axis of the pivot bearing 132. The rotation of the actuator 124 moves the head 120 across the surface of the disk 112. At this time, the rotation of the disk 112 by the spindle motor 114 induces air to flow between the rotating surface of the disk 112 and a head slider. The head slider is integral with the suspension and includes the air bearing surface and the read/write head 120. As a result, the read/write head 120 is elevated above the surface of the disk 112 as biased towards the disk 112 by the suspension.

FIG. 2 illustrates flying on demand (FOD) technology 220 that has recently been used for controlling the elevation of the read/write head, i.e., the height at which the head floats above the surface of the disk during a read/write operation. Referring to FIG. 2, the head 230 is an integral part of a head slider 220 and includes a recording element 236, a reading element 232, and an FOD heater 234 located between the recording element 236 and the reading element 232. The FOD heater 234 may comprise a pole at the periphery of the head, and a resistive heating element in the form of a coil wound around the pole. An air cushion is formed between the air bearing surface of the head slider 220 and the surface 210 of a disk when the disk is rotated. As a result, the head 230 floats or hovers above the surface 210 of the disk in a state in which a predetermined clearance is maintained between the head 230 and the disk. Reference numeral 212 indicates variations in the height of the surface disk surface 210. However, the head slider 220 is supported so that the predetermined clearance is maintained despite such variations.

Assuming that the target (desired) clearance between the head 230 and the surface 210 of the disk is A+B+C, the elevation to which a particular head 230 will be raised above the surface 210 of the disk may be as small as B+C due to mechanical tolerances or to other characteristics of the air bearing created by the head 230 and the rotating surface of the disk. In addition, the elevation may be reduced to as low as C due to environmental conditions such as temperature changes or changes in atmospheric pressure. In this case, though, the elevation of the head 230 can be controlled by operating the FOD heater 234 so that a sufficient clearance is maintained between the head 230 and the surface 210 of the disk during a read/write operation.

That is, the FOD technology 220 employs a heater to control the clearance between the disk and the head. Thus, the FOD technology 220 can be employed to ensure that all heads will float at the same height above the surface of a disk rotating a certain speed. More specifically, FOD technology ensures a uniform head disk interface (HDI) between the head and the disk and thereby minimizes the bit error rate (BER).

A burn-in process is used to determine certain physical characteristics of the read/write heads of hard disk drives which are mass-produced, i.e., are manufactured using the same process under identical environmental conditions (e.g., temperature, humidity, and pressure). Also, the burn-in process is used to determine the data storage capacity of the disks of the hard disk drives. The results of the burn-in process are then incorporated into the hard disk drives in an attempt to ensure that a sufficient clearance is maintained between the heads and the disks of the hard disk drives. Specifically, the results of the burn-in process are used to control the power circuits that supply current to the heaters of the FOD technology.

FIG. 3 illustrates a conventional method of correlating the elevation of a read/write head of a hard disk drive (represented in the figure as FH or "flying height") to temperature using a burn-in process. The burn-in process begins by loading a plurality of hard disk drives into a burn-in chamber. Then, the FH of a read/write head of each hard disk drive is measured at a normal temperature (e.g., 25° C.) in the burn-in chamber (S310).

Next, one of the hard disk drives is selected (S320). Subsequently, the FH of the head of the selected hard disk dive is measured at each of several test temperatures (S330). For example, the FH of the head is measured at a low temperature (e.g., 0° C.), at the normal temperature (e.g., 25° C.), and at a high temperature (e.g., 55° C.) in the burn-in chamber.

An equation is formulated using values of the FH of the head of the selected hard disk drive measured at each test temperature (S340). The equation represents the FH of the head as a function of temperature. The equation may be represented as a first degree polynomial function. That is, the correlation between temperature and the flying height of the head of the selected hard disk drive may be established in the form of a linear relationship.

Finally, the flying height of the head of each of the rest of the hard disk drives at each test temperatures is estimated using the equation (S350). More specifically, the flying height of each head at the normal temperature is actually measured. Then, the linear relationship between FH and temperature, as determined based on the selected head, is used to estimate the FH of the head of each of the rest of the hard disk drives at the low and high temperatures. Such data, representing a correlation between FH and temperature, is then stored the hard disk drives.

FIG. 4A is a graph illustrating the results obtained using the conventional method. FIG. 4B, on the other hand, illustrates results obtained by the present inventors when the FH of all of the heads of the hard disk drives was actually measured at each of the test temperatures.

In FIG. 4A, the solid line represents the linear relationship between the FH of the head of the selected hard disk drive (hd1) and the temperatures at which the FH was measured. That is, the FH of the head hd1 as a function of temperature is represented as a line having a certain slope. Therefore, in the conventional method, linear polynomial functions, representing the FH of the heads of the rest of the hard disk drives (h2, h3) as a function of temperature, are each formulated based on the assumption that the slopes of the functions are identical to that of the equation formulated using the head hd1.

However, as shown in FIG. 4B, the estimates of the FH of the heads of each of the rest of the hard disk drives differ from the actual FH. That is, the slope of the linear function applicable to the head of the selected hard disk drive is not applicable to the heads of the other hard disk drives. This is due to the fact that even when the corresponding parts of the hard disk drives are manufactured under identical conditions and using identical processes, the parts have different characteristics as the result of, for example, slight variations in the material used to manufacture the parts.

SUMMARY OF THE INVENTION

An object of the present invention is to provide a method by which the influence of the temperature of ambient air on the flying height of a read/write head of a hard disk drive can be accurately predetermined.

Another object of the present invention is to provide a method of controlling the elevation of a read/write head of a hard disk drive which will precisely maintain a target clearance between the head and a surface of a disk of the drive as the head follows a track of the disk.

Another object of the present invention is to provide a method in a burn-in process of producing data that accurately characterizes the read/write heads of hard disk drives irrespective of slight differences in physical properties of the heads which may have been produced when the heads were manufactured.

According to one aspect of the present invention, there is provided a method of producing data that characterizes a read/write head of a hard disk drive, which includes measuring the flying height of the head at a first temperature in a burn-in chamber, measuring the flying height of the head at a second temperature in a burn-in chamber, and estimating the flying height of the head at a third temperature using a linear relationship established on the basis of the values the flying heights measured at the first and second temperatures. The third temperature is preferably a temperature that is lower than the first and second temperatures. The first temperature may be 20-30° C., the second temperature may be 50-60° C., and the third temperature may be −5-5° C. The first and second temperatures may be the temperatures to which the temperature regulator of the burn-in chamber is set. Alternatively, the first and second temperatures may be those measured by temperature sensors, e.g., thermistors, of the hard disk drives so as to more accurately indicate the temperature of the air in the immediate vicinity of the read/write head.

Also, the first flying height of the read/write head may be measured at each (first and second) temperature by supplying electric power to a FOD (Flying On Demand) heater of the head, monitoring the head and determining when the head comes into contact with the surface of the disk as the electric power is being increased, i.e., at the point in time at which the head touches down, and estimating the flying height of the head based on the magnitude of the electric power being supplied to the FOD heater at the point in time at which the head touches down. Also, a Wallace space loss equation may be used to measure the flying height of the head.

The method may further include ascertaining a weight based on the slope of an equation representative of the linear relationship, and calculating a corrected value of the flying height at the third temperature by applying the weight to the value of the flying height initially ascertained at the third temperature. The weight may be calculated according to the following equation:

$$W=82.713*A+1.1637-\sigma$$

wherein A is the slope, and $\sigma$ is a standard deviation. The standard deviation may be 0.08324.

In addition, a determination may be made as to whether the corrected value of the flying height at the third temperature is equal to or greater than the value of the flying height at the first temperature. In this case, the value of the flying height at the first temperature is designated as the corrected value of the flying height when the corrected value of the flying height is less than the value of the flying height at the first temperature.

According to another aspect of the present invention, there is provided a method of controlling the height at which a read/write of a hard disk drive head floats above a surface of a disk during a read/write operation in which the head follows a track of the disk, which method includes first testing the hard disk drive according to the method summarized above so as to thereby produce data that characterizes the head, and additionally storing in an MC (Maintenance Cylinder) region of the disk data representative of respective values of the flying height of the head as measured at the first and second temperatures and as ascertained at the third temperature, and then controlling the elevation of the head based on the data stored in the MC region when the head follows a track of the disk.

The elevation of the head is preferably controlled by detecting the temperature of ambient air in the hard disk drive, using the data stored in the MC region to estimate the height at which the head floats above the surface of the disk when the ambient air in the hard disk drive is at the detected temperature, and controlling a FOD heater of the head on the basis of the estimated flying height of the head. More specifically, a magnitude of electric power is ascertained based on the estimate of the height at which the head is floating above the surface of the disk. The magnitude of the electric power is one that is calculated to maintain a target clearance between the head and the surface of the disk.

According to still another aspect of the present invention, there is provided a burn-in process which includes loading a plurality of hard disk drives into a burn-in chamber, varying the temperature of the ambient air in the burn-in chamber, and producing flying height/temperature data for each head independently of the others. In this respect, the flying height of the read/write head of each of the hard disk drives is measured at first and second temperatures in the burn-in chamber, respectively. Then, a value of the flying height of the read/write head of each of the respective hard disk drives at a third temperature is estimated using values of the flying heights measured at each of the first and second temperatures. Thus, the values of the flying height measured at each of the first and second temperatures and estimated for the third temperature can be used to independently formulate equations that represent the flying height as a function of temperature for each of the hard disk drives.

BRIEF DESCRIPTION OF THE DRAWINGS

The above and other objects, features and advantages of the present invention will become more apparent by referring to the detailed description of the preferred embodiments thereof made with reference to the attached drawings in which.

DETAILED DESCRIPTION OF THE PREFERRED EMBODIMENTS

Figure 1:
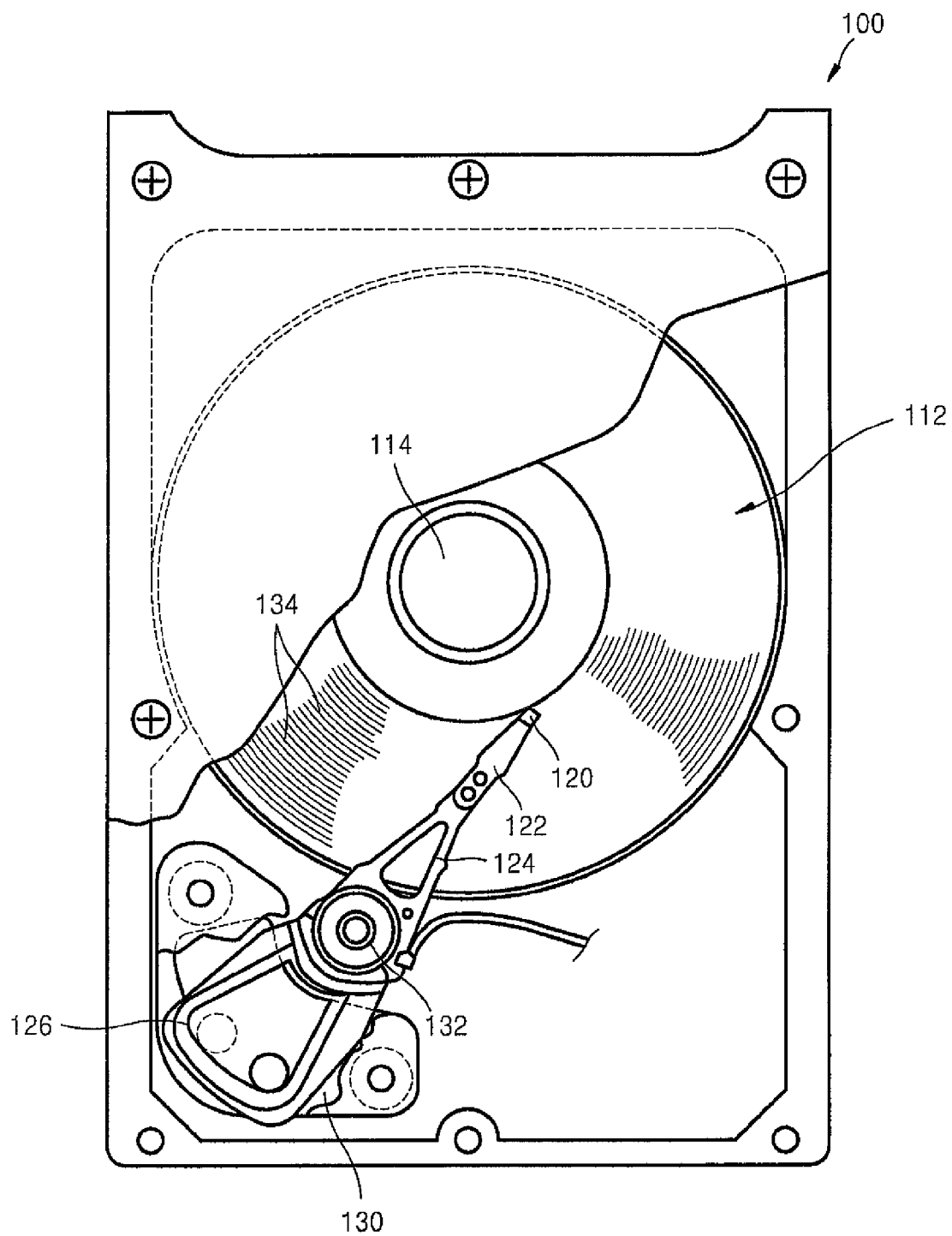
FIG. 1 is a partially broken-away plan view of a conventional hard disk drive to which methods of the present invention can be applied.
Figure 2:
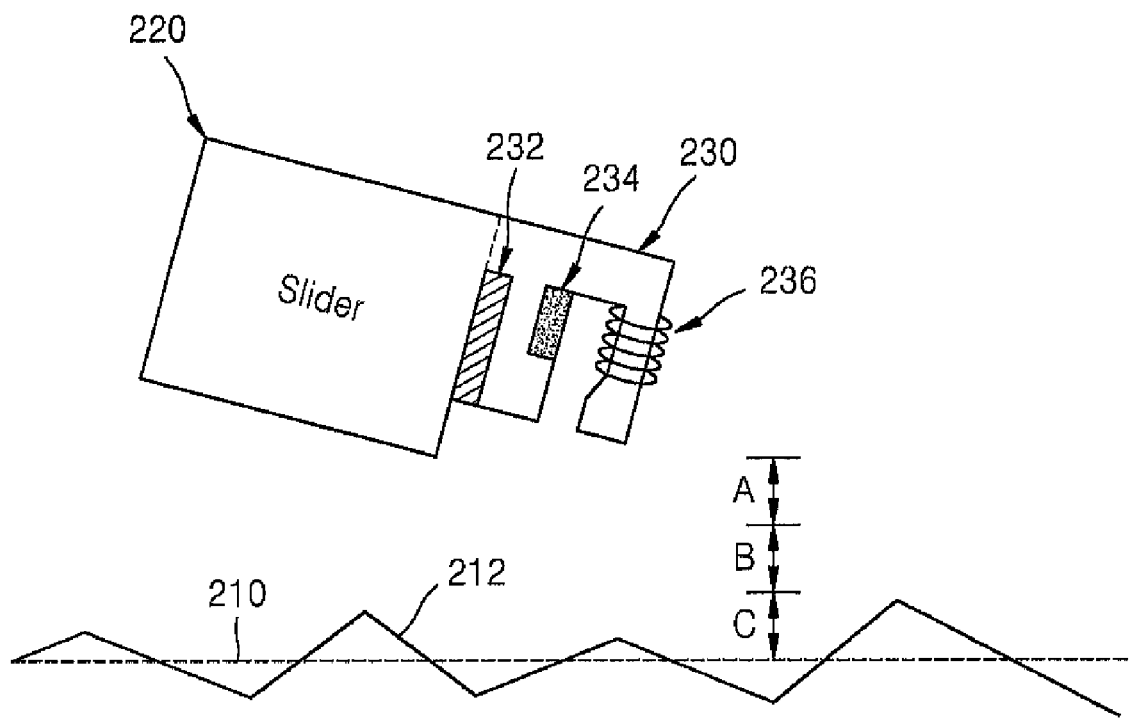
FIG. 2 is a schematic diagram of a read/write head of the conventional hard disk drive as it floats above a surface of a disk.
Figure 3:
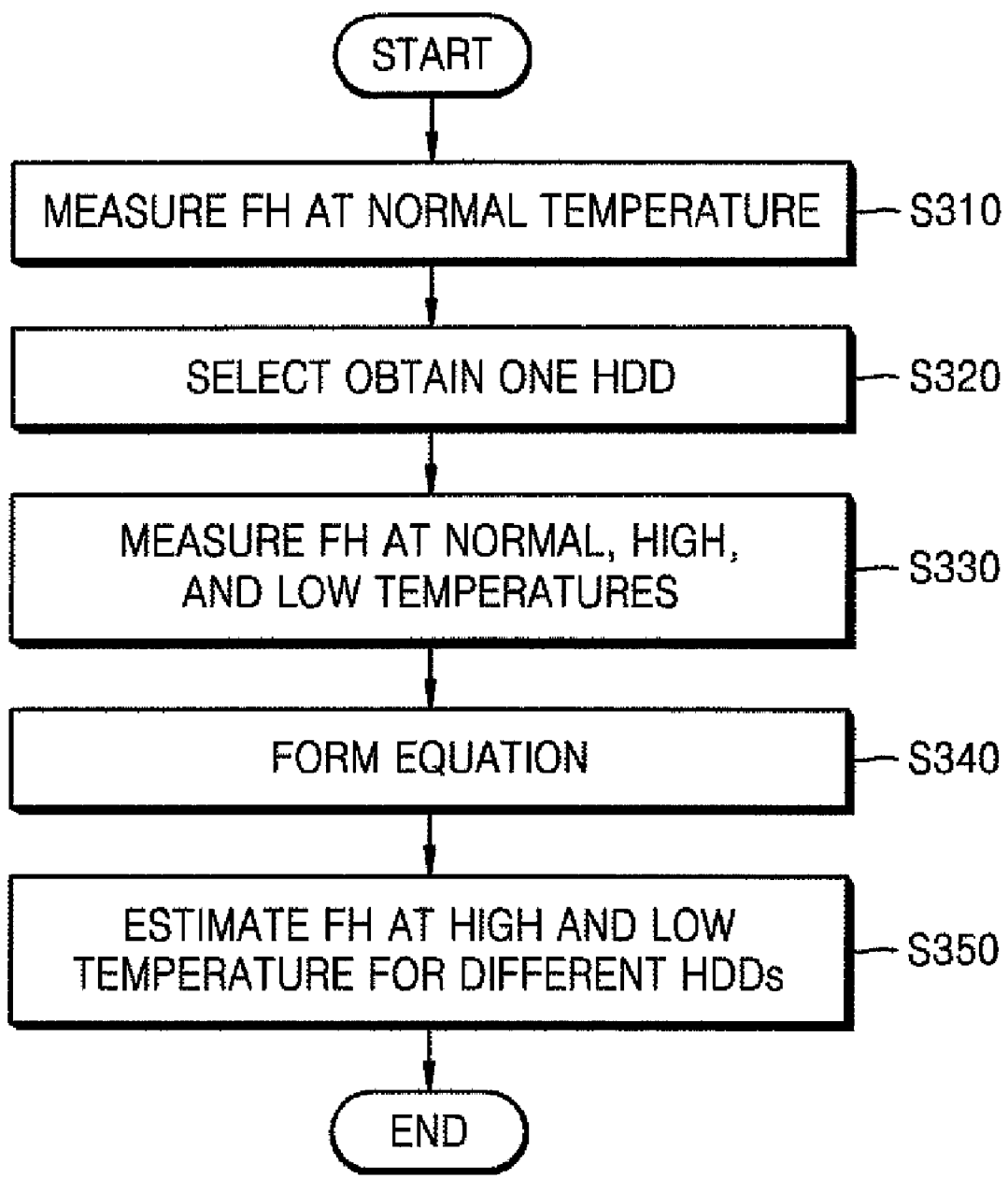
FIG. 3 is a flowchart of a conventional method of generating data characterizing the read/write heads of hard disk drives.
Figure 4A:
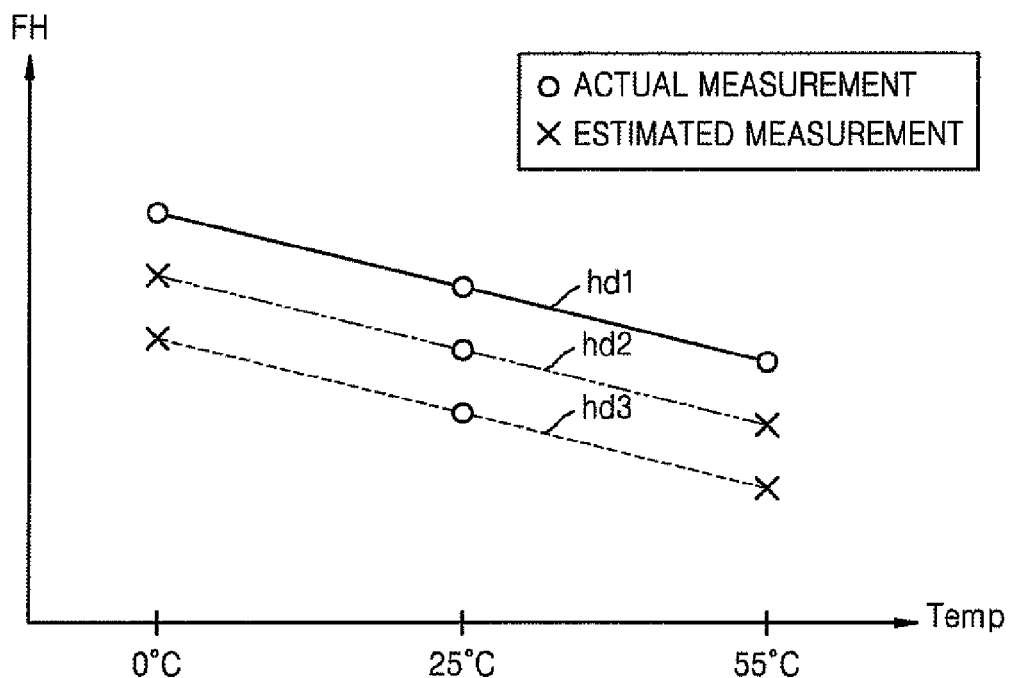
FIG. 4A is a graph illustrating the data generated in accordance with the conventional method illustrated in FIG. 3.
Figure 4B:
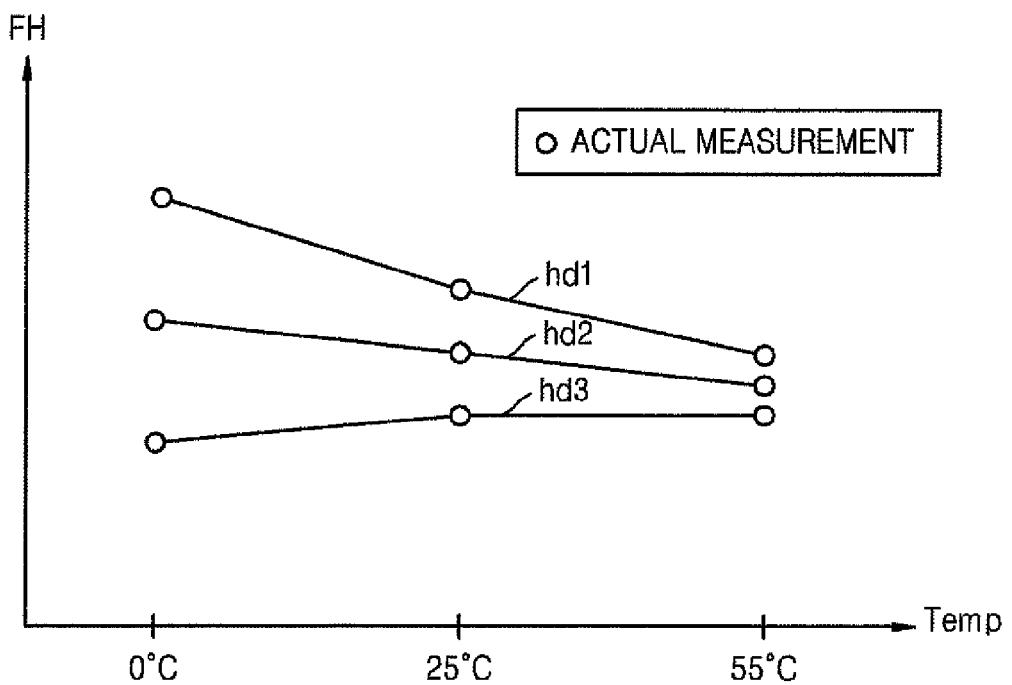
FIG. 4B is a graph of corresponding data generated by performing actual measurements.

The methods of the present invention will now be described in more detail with reference to FIGS. 5-9. Note, such methods are applicable to a hard disk drive as described with reference to FIG. 1. Also, a read/write head may be described as floating "above" a surface of a disk during a method according to the present invention. However, and depending on the orientation of the hard disk drive, it is known that a read/write head may be physically disposed below a disk. Therefore, it will be evident to those skilled in the art that certain terms in the description, such as "above" or "over", are used in a relative sense only.

Figure 5:
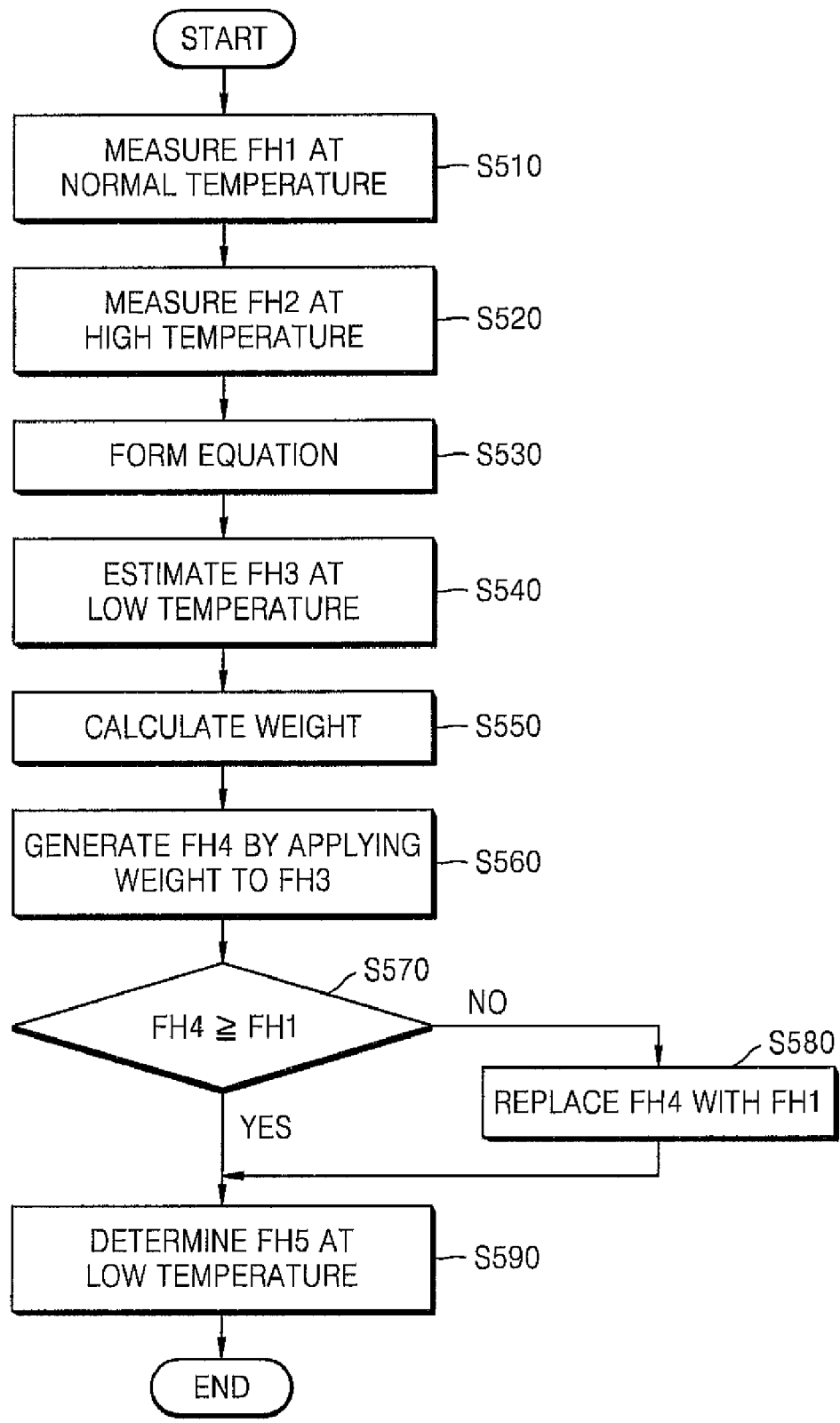
FIG. 5 is a flowchart of a method of generating data characterizing a read/write head of a hard disk drive with temperature according to the present invention.

Referring now to FIG. 5, FIG. 5 shows a method of determining operating characteristics of the read/write heads of hard disk drives, in a burn-in process, according to the present invention. The hard disk drives are mass-produced, i.e., are manufactured under identical environmental conditions (e.g., temperature, humidity, and pressure) using identical processes. In the burn-in process, the hard disk drives are loaded into a burn-in chamber.

The elevation at which the read/write head of each hard disk drive floats or hovers above the surface of the disk, referred to herein as the flying height (FH), is measured at a normal temperature T1 in the burn-in chamber (S510). That is, this value FH1 of the flying height is obtained for all of the hard disk drives in the burn-in chamber. (This measurement process will be described later on in detail with reference to FIG. 6). Also, note, a hard disk drive may have a plurality of heads. In this case, the FH of each of the heads of each hard disk drive is measured at the normal temperature. The normal temperature T1 is about 20-30° C., preferably 25° C. Subsequently, the values FH1 are recorded (stored) in a maintenance cylinder (MC) region of the hard disk as correlated with the value of the normal temperature T1. The MC region exists at the outer periphery of the disk and has 20-30 cylinders (each cylinder comprising several tracks of the same radius).

Also, the FH of the head(s) of each hard disk drive in the burn-in chamber is/are measured at a high temperature T2 (S520). That is, a value FH2 of the flying height is obtained for each head of all of the hard disk drives in the burn-in chamber. The high temperature T2 is about 50-60° C., preferably 55° C. Note, the steps S510 and S520 described above may be performed in any order. Subsequently, the values FH2 are recorded (stored) in the MC region of the disk as correlated with the value of the high temperature T2.

Next, an equation is formulated using the values FH1 obtained at the normal temperature T1 and the values FH2 obtained at the high temperature T2. The equation represents a linear function because the temperature and the height at which the head will float at such temperature (FH) basically have a linear relationship. For example, the linear function can be represented by the following equation 1.

$$y = \frac{FH2 - FH1}{T2 - T1} x + \frac{FH1 * T2 - FH2 * T1}{T2 - T1} \qquad \text{[Equation 1]}$$

wherein T1 and T2 are the normal and high temperatures, respectively, x is a variable representing the temperature and y is a variable representing the flying height of the head.

A value FH3 of the flying height of each head at a low temperature T3 is estimated (calculated) using the equation 1 (S540). That is, the value FH3 is obtained by substituting the low temperature T3 into equation 1 for the variable x. The low temperature T3 is about −5-5° C., preferably 0° C. This step S540 is applied to all of the hard disk drives in the burn-in chamber. In addition, in the case mentioned above in which each of the hard disk drives has a plurality of read/write heads, a respective value FH3 of the flying height for each of the heads at the low temperature is estimated.

Next, a predetermined weight that varies depending on the slope A of equation 1 may be applied to the estimated value FH3.

The weight W may be calculated (S550) from the following equation 2.

$$W=82.713*A+1.1637-\sigma \quad \text{[Equation 2]}$$

wherein A is the slope of equation 1 and $\sigma$ is a standard deviation. The standard deviation may have a value of 0.08324.

A corrected value FH4 of the flying height at the low temperature T3 is calculated by multiplying the value FH3 by the weight W (S560). This step is applied to each of the heads.

Next, a determination is made as to whether the corrected value FH4 is equal to or greater than the value FH1 of the flying height, for each of the heads (S570). In principle, the lower the temperature, the higher the head will float above the surface of the disk, i.e., the greater the flying height (FH). However, the corrected value FH4 may be lower than the value FH1 when the weight W is applied to the value FH3. Therefore, the value FH4 is designated as a final value FH5 of the flying height at the low temperature T3 when the value FH4 is equal to or greater than the value FH1 (S590). Conversely, the value FH1 is substituted for the value FH4 when the value FH4 is less than the value FH1, and the value FH1 is then designated as the final value FH5 of the flying height of the head at the low temperature T3 (S580). The values FH5 of the heights at which each head will float above the surface of the disk at the ambient low temperature T3 are recorded (stored) in the MC region of the hard disk.

Figure 6:
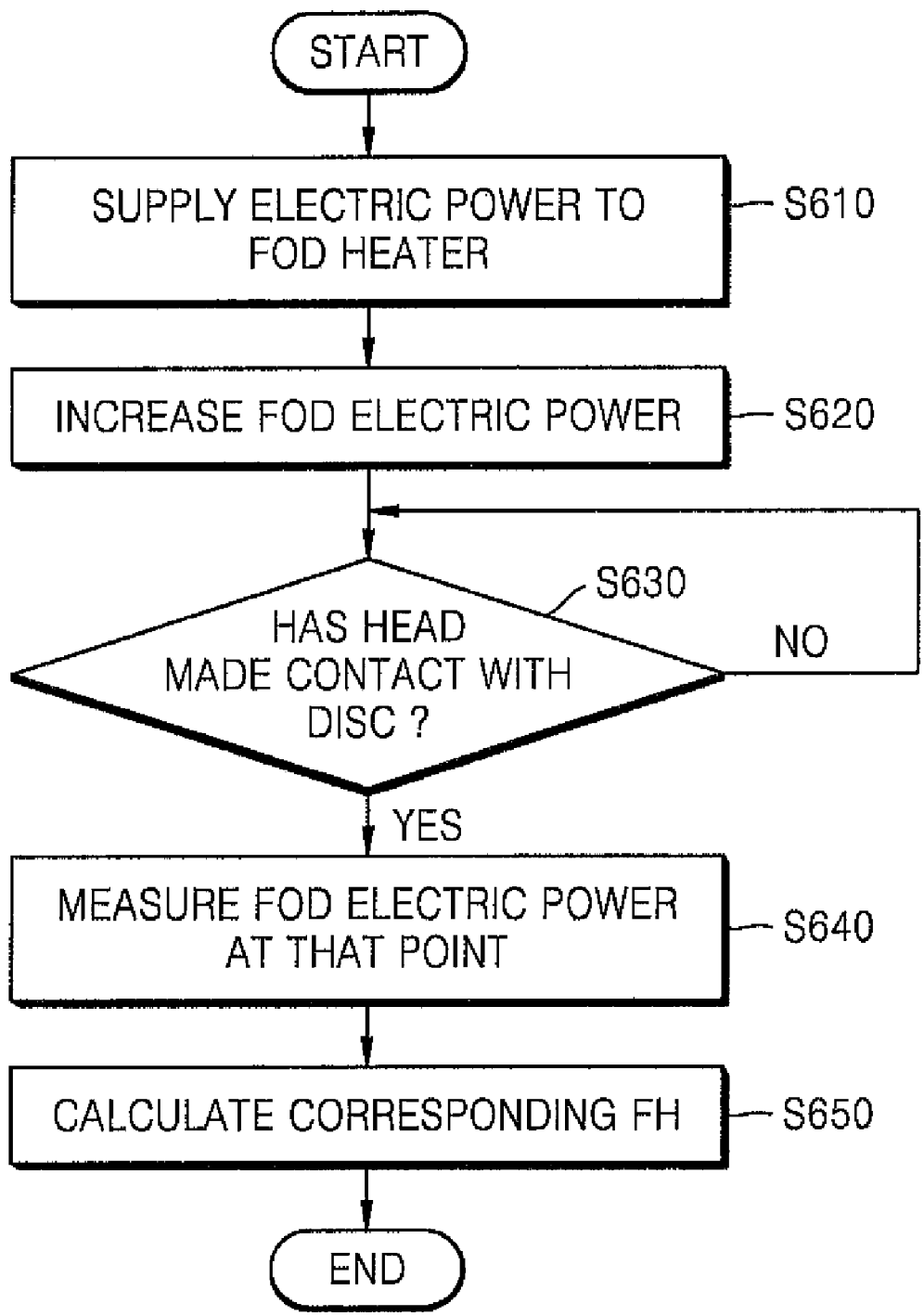
FIG. 6 is a flowchart of a method of measuring the flying height of a read/write head of a hard disk drive according to the present invention.

FIG. 6 is a flowchart illustrating a method of measuring the flying height of a read/write head of a hard disk drive according to the present invention. This method may be used to obtain the values FH1, FH2 in the method described above with reference to FIG. 5.

Electric power is supplied to the FOD heater of the hard disk drive while the hard disk drive is in an environment maintained at a specific temperature (S610). As described in the background of the invention, the FOD heater may comprise a resistive heating element in the form of a coil. The pole of the heater, i.e., a peripheral portion of the head, starts expanding when electric power is fed to the FOD heater. The amount of expansion is proportional to the magnitude of the electric power supplied to the FOD heater.

The specific temperature is a temperature provided by test equipment, e.g., a burn-in chamber. However, the internal temperature of each of the hard disk drives may vary in accordance with the location of each of the hard disk drives in the burn-in chamber, even when the test equipment is set to maintain the burn-in chamber at the specific temperature. Therefore, each of the hard disk drives may be provided with a temperature sensor such as a thermistor. Therefore, the temperature at which the floating height is being measured can be precisely determined.

The electric power that is being applied to the FOD heater is increased (S620). Accordingly, the thermal expansion of the head increases. At this time, the head is monitored to determine whether the head has touched-down (S630). The term "touched-down" refers to a state in which the head contacts the disc. Whether the head has touched-down is determined from an automatic gain control (AGC) or a position error signal (PES). For example, the head is determined to have touched-down when the PES is greater than a threshold valve.

Figure 7:
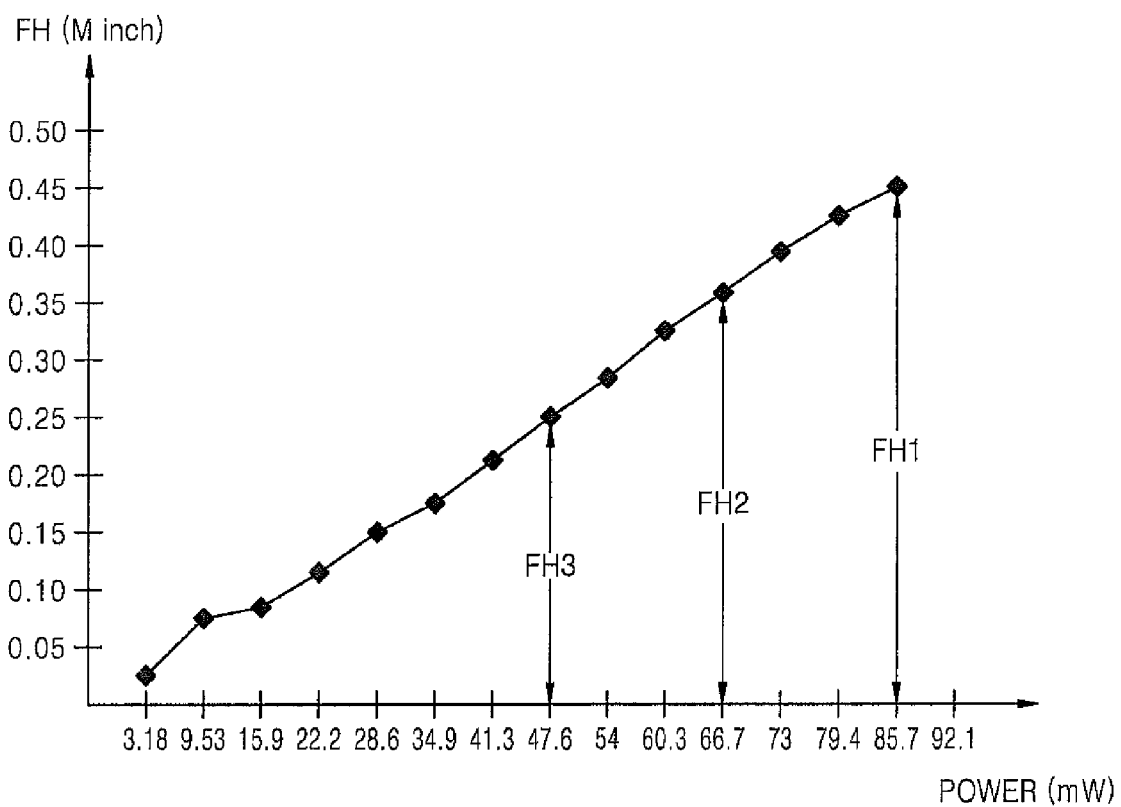
FIG. 7 is a graph illustrating the magnitude of the FOD power necessary to cause read/write heads to touch down depending on the height at which the head is floating above the surface of the disk under the influence of the temperature of the ambient air.

The magnitude of the power supplied to the FOD heater is measured at the point in time at which the head touches-down (S640). Next, the flying height of the head, which corresponds to the FOD power, is calculated (S650). The read/write head rises off of the surface of the disk as the ambient temperature decreases. Therefore, the FOD power necessary to cause the head to touch down at a low temperature is greater than the FOD power necessary to cause the head to touch down at a normal or high temperature. Accordingly, the flying height can be estimated based on the increase in the FOD which caused the head to touch down. In this respect, FIG. 7 is a graph illustrating the relationship between the flying height of a read/write head and the FOD power necessary to cause the head to touch down. FIG. 7 shows the values of the FOD power required to cause the head to touch down when the head is at the low temperature (and the flying height of the head has the value FH1 before the power is supplied), when the head is at the normal temperature (and the flying height of the head has the value FH2 before the power is supplied), when the head is at the high temperature (and the flying height of the head has the value FH3 before the power is supplied).

Also, a Wallace space loss equation may be used to calculate the flying height of the head in obtaining the values FH1, FH2 in the method of FIG. 5. The calculating of the flying height of a read/write head of a hard disk drive using a Wallace space loss equation is well known in the art and thus, a detailed description thereof will be omitted herein.

Figure 8:
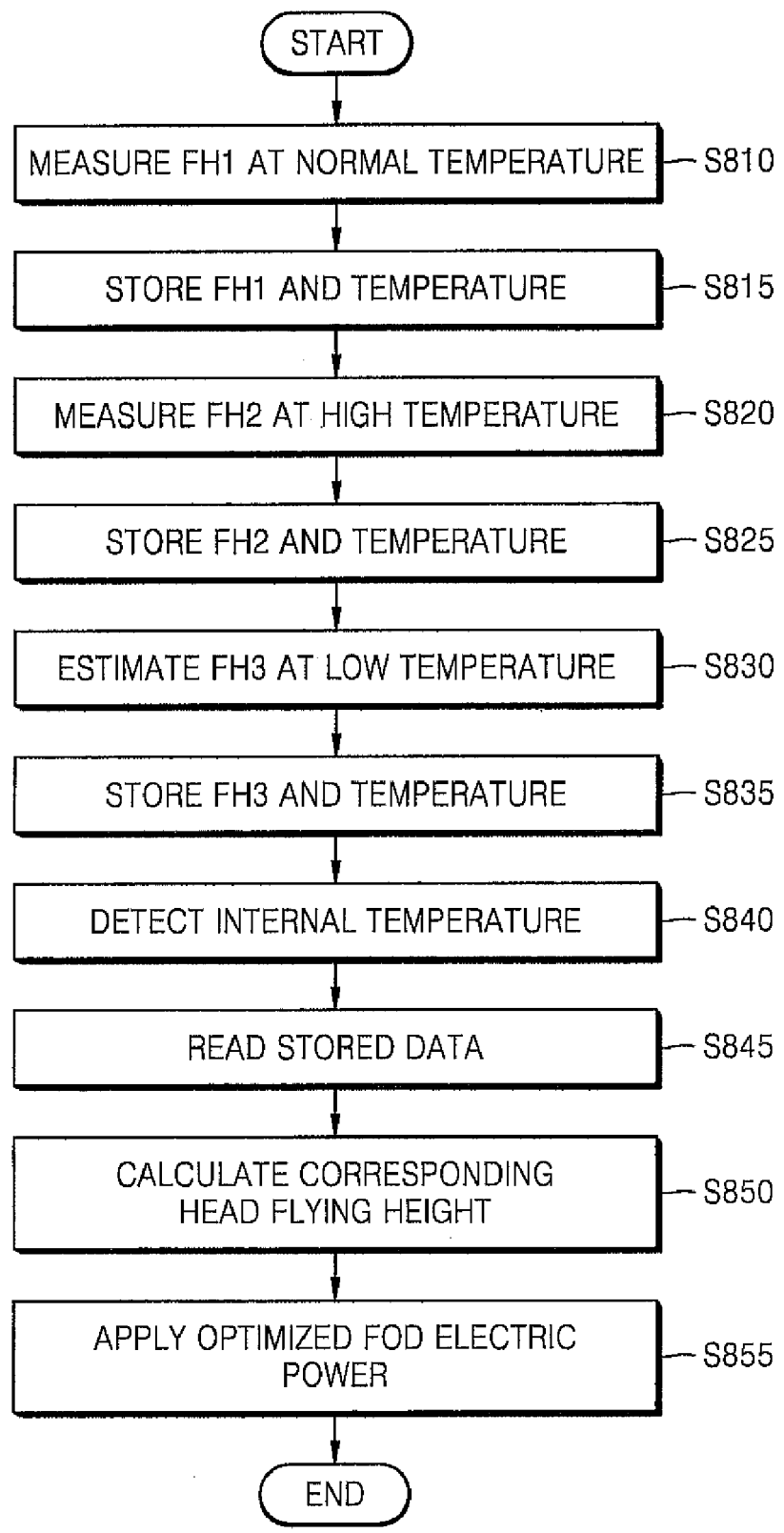
FIG. 8 is a flowchart of a method of controlling the elevation of a read/write head of a hard disk drive according to the present invention.

A method of controlling the elevation of a read/write head according to the present invention will now be described with reference to the flowchart of FIG. 8. Note, the method may employ steps corresponding to those described above in connection with FIGS. 5 and 6. Therefore, these steps will only be briefly described below in the context of the overall method of controlling the elevation of the read/write head. That is, all other details of the steps may be the same as those described with reference to FIGS. 5 and 6.

The flying height FH of the read/write head(s) of each hard disk drive disposed in a burn-in chamber is measured at a normal temperature T1 (S810). The normal temperature T1 may be about 20-30° C., preferably 25° C. Subsequently, a value FH1 of the flying height of each head measured at the normal temperature T1 is stored (in the MC region) as correlated with the normal temperature T1 (S815).

Also, the flying height FH of the read/write head(s) of each hard disk drive disposed in the burn-in chamber is measured at a high temperature T2 (S820). The high temperature T2 may be about 50-60° C., preferably 55° C. Subsequently, a value FH2 of the flying height of each head measured at the normal temperature T2 is stored (in the MC region) as correlated with the normal temperature T2 (S825).

Next, a value FH3 of the flying height of each head at a low temperature T3 is estimated using the values FH1 and FH2 of the flying heights at the respective normal and high temperatures (S830). For example, the value FH3 may be calculated using equation 1. However, the value FH3 of the head may be estimated through some other form of extrapolation using the values FH1 and FH2.

Then, a weight may be applied to the value FH3 of the head to obtain a corrected value FH4 of the flying height of the head. Also, the corrected value FH4 may be analyzed, e.g., compared with the value FH1, to determine whether it is an accurate estimate of the flying height of the head at the low temperature T3. In any case, the final value designated as the estimated value of the flying height of the head at the low temperature T3 is stored (in the MC region) as correlated with the low temperature (S835). Note, the actual steps (S815, S825, and S835) of storing the values of the flying heights of the heads may be performed after the step of determining the final value of the flying height at the low temperature T3.

The next part of the method refers now to when one of the hard disk drives has been put into operation. First, an internal temperature of the hard disk drive is detected (S840) while the hard disk drive is operating, i.e., during a read/write operation. The internal temperature may be detected by a temperature sensor located in a pre-amplifier installed in the hard disk drive. A signal indicative of the detected internal temperature is sent to the controller of the hard disk drive.

The controller reads the stored data (S845). The stored data represents the values of the flying heights of the head at respective temperatures (normal, high, and low temperatures). A flying height corresponding to the detected internal temperature is calculated using the stored data (S850). That is, a value of the estimated flying height of the head, i.e., an estimate of the height at which the head floats above the disk while in an environment under the detected internal temperature, is interpolated by the controller from the data stored in the MC region.

Then, the controller compares the estimated flying height with the desired clearance that should be maintained between the head and the disk. Next, the controller controls the electric power supplied to the FOD heater to optimize the flying height of the head for the read/write operation (S855). That is, the amount of electric power fed to the FOD heater is increased or decreased by a predetermined amount if the estimated flying height differs from the desired clearance between the head and the disk. Accordingly, a predetermined clearance can be maintained between the head and the disk.

Figure 9:
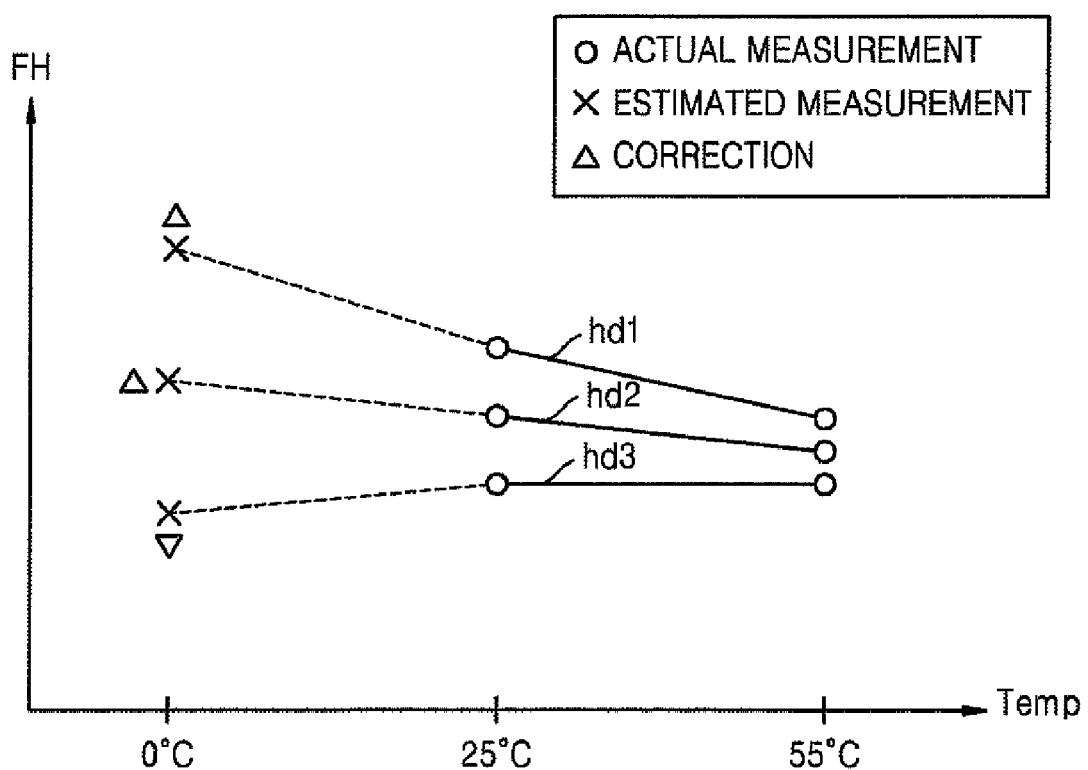
FIG. 9 is a graph illustrating data characterizing read/write heads and produced according to the present invention.

FIG. 9 is a graph illustrates the flying height data generated in accordance with the present invention, for use in the method described above with reference to FIG. 8. Note, as shown in FIG. 9, the flying height of each head (hd1, hd2 or hd3) varies according to temperature. Also, note, that the slope of the linear equation representing the flying height as a function of temperature differs for each of the heads hd1, hd2 and hd3.

According to the present invention as described above, the flying height of the head at a first (e.g., normal room) temperature and the flying height of the head at a second (e.g., relatively high) temperature are actually measured and the flying height of the head at a third (e.g., relatively low) temperature is estimated using the actual measurements of the flying height. Furthermore, the estimated flying height can be weighted.

Also, according to the present invention, the characteristics of the read/write heads of each of several hard disk drives are basically determined independently of one another even though the hard disk drives are produced as part of the same lot.

Accordingly, the influence of temperature on the elevation of the read/write head can be accurately characterized, namely, the flying height of the head as a function of temperature can be precisely formulated. Thus, the elevation of the read/write head can be controlled to maintain precisely a desired clearance between the head and the surface of the disk.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A method of producing data to characterize a read/write head of a hard disk drive, the method comprising:
   loading the hard disk drive into a burn-in chamber;
   measuring the flying height of the read/write head at a first temperature in the burn-in chamber, wherein the flying height is the distance between the read/write head and a surface of a disk of the hard disk drive when the read/write head floats over the surface of the disk while the disk is being rotated by a motor of the hard disk drive;
   measuring the flying height of the head at a second temperature, that is different from the first temperature, in the burn-in chamber;
   postulating a linear relationship between the flying height of the head and a temperature of the ambient air in the burn-in chamber based on the measured flying heights of the head at the first and second temperatures in the burn-in-chamber; and
   ascertaining the flying height of the head at a third temperature, that is different from the first and second temperatures, using the linear relationship between the flying height of the head and the temperature of the ambient air in the burn-in chamber.

2. The method of claim 1, wherein the measuring of the flying height of the head at each of the first and second temperatures comprises:
   supplying electric power to a POD (Flying On Demand) heater integral with the head, and increasing the power;
   monitoring the head and determining when the head comes into contact with the surface of the disk as the electric power is being increased; and
   estimating the flying height of the head based on the magnitude of the electric power being supplied to the POD heater at the point in time at which the head comes into contact with the surface of the disk.

3. The method of claim 1, wherein the measuring of the flying height of the head at each of the first and second temperatures comprises performing a calculation using a Wallace space loss equation.

4. The method of claim 1, further comprising:
   ascertaining a weight based on the slope of an equation representative of the linear relationship; and
   calculating a corrected value of the flying height at the third temperature by applying the weight to the value of the flying height ascertained at the third temperature using the linear relationship.

5. The method of claim 4, wherein the weight is ascertained according to the following equation:

$$W=82.713*A+1.1637-\sigma$$

wherein W is the value of the weight, A is the slope, and σ is a standard deviation.

6. The method of claim 5, wherein the standard deviation is 0.08324.

7. The method of claim 4, further comprising:
   determining whether the corrected value of the flying height at the third temperature is equal to or greater than the value of the flying height at the first temperature; and
   designating the value of the flying height at the first temperature as the corrected value of the flying height when the corrected value of the flying height is less than the value of the flying height at the first temperature.

8. The method of claim 1, wherein the third temperature is lower than the first and second temperatures.

9. The method of claim 8, wherein the first temperature is 20-30° C., the second temperature is 50-60° C., and the third temperature is −5-5° C.

10. The method of claim 1, wherein the first and second temperatures are temperatures to which a temperature regulator of the burn-in chamber is set.

11. The method of claim 1, wherein the first and second temperatures are measured within the hard disk drive so as to be temperatures of the ambient air within the hard disk drive.

12. A method of controlling the height at which a read/write of a hard disk drive head floats above a surface of a disk during a read/write operation in which the head follows a track of the disk, the method comprising:
   characterizing the head by measuring the flying height of the read/write head at a first temperature in a burn-in chamber, wherein the flying height is the distance between the read/write head and a surface of a disk of the hard disk drive when the read/write head floats over the surface of the disk as the disk is being rotated,
   measuring the flying height of the head at a second temperature in the burn-in chamber, that is different from the first temperature;
   postulating a linear relationship between the flying height of the head and a temperature of the ambient air in the burn-in chamber,
   ascertaining the flying height of the head at a third temperature, that is different from the first and second temperatures, using the relationship between the flying height of the head and the temperature of the ambient air in the burn-in chamber, and
   storing data representative of respective values of the flying height, as measured at the first and second temperatures and as ascertained at the third temperature, m an MC (Maintenance Cylinder) region of the disk; and
   controlling, during an operation of hard disc drive external the burn-in chamber, the elevation of the head based on the data stored in the MC region when the head follows a track of the disk.

13. The method of claim 12, wherein the measuring of the flying height of the head at each of the first and second temperatures comprises:
   supplying electric power to a FOD (Flying On Demand) heater integral with the head, and increasing the power;
   monitoring the head and determining when the head comes into contact with the surface of the disk as the electric power is being increased; and
   estimating the flying height of the head based on the magnitude of the electric power being supplied to the FOD heater at the point in time at which the head comes into contact with the surface of the disk.

14. The method of claim 12, wherein the controlling of the elevation of the head comprises:
   detecting the temperature of ambient air in the hard disk drive;
   using the data stored in the MC region to estimate the height at which the head floats above the surface of the disk when the ambient air in the hard disk drive is at the detected temperature;
   ascertaining, based on the estimate as to the height at which the head is floating above the surface of the disk, a magnitude of electric power calculated to maintain a target clearance between the head and the surface of the disk in the case in which electric power of said magnitude is supplied to a POD (Flying On Demand) heater integral with the head; and
   controlling the amount of electric power supplied to the FOD heater so that electric power of said magnitude is supplied to the POD heater.

15. The method of claim 14, wherein the data stored in the MC region is interpolated to determine the height at which the head floats above the surface of the disk when the ambient air in the hard disk drive is at the detected temperature.

16. The method of claim 12, wherein the ascertaining of the flying height of the head at the third temperature further comprises ascertaining a weight corresponding to the slope of an equation representative of the linear relationship, and calculating a corrected value of the flying height at the third temperature by applying the weight to the value of the flying height ascertained at the third temperature.

17. The method of claim 12, wherein the steps of characterizing the head of the disk drive are performed as part of a burn-in process in which the hard disk drive is disposed in the burn-in chamber.

18. A burn-in process comprising:
   loading a plurality of hard disk drives into a burn-in chamber, each of the hard disk drives including a read/write head, a disk, and a motor for rotating the disk;
   varying the temperature of the ambient air in the burn-in chamber;
   measuring the flying height of the read/write head of each of the hard disk drives at first and second temperatures in the burn-in chamber, respectively, wherein the flying height is the distance between the read/write head and a surface of the disk of the respective hard disk drive when the read/write head floats over the surface of the disk while the disk is being rotated by the motor of the hard disk drive; and
   estimating a value of the flying height of the read/write head of each of the respective hard disk drives at a third temperature using values of the flying heights measured at each of the first and second temperatures for the respective hard disk drive, whereby the values of the flying height measured at each of the first and second temperatures and estimated for the third temperature can be used to formulate independently of one another equations that represent the flying height as a function of temperature for each of the hard disk drives.

19. The burn-in process of claim 18, wherein the estimating of the value of the flying height of the read/write head of each of the respective hard disk drives at the third temperature comprises:
   postulating a linear relationship between the flying height of the head and a temperature of the ambient air in the burn-in chamber, and based on the linear relationship extrapolating the values of the flying heights measured at each of the first and second temperatures,
   ascertaining a weight based on the slope of an equation representative of the linear relationship, and
   calculating a corrected value of the flying height at the third temperature by applying the weight to the value of the flying height ascertained at the third temperature using the linear relationship.

20. The burn-in process of claim 19, wherein the weight is ascertained according to the following equation:

$$W = 82.713*A + 1.1637 - \sigma$$

wherein W is the value of the weight, A is the slope, and $\sigma$ is a standard deviation.

21. The burn-in process of claim 18, wherein the third temperature is lower than the first and second temperatures.

* * * * *